United States Patent
Liao et al.

(10) Patent No.: US 7,382,567 B2
(45) Date of Patent: Jun. 3, 2008

(54) ACCELEROMETER-BASED DIFFERENTIAL FREE FALL DETECTION SYSTEM, APPARATUS, AND METHOD AND DISK DRIVE PROTECTION MECHANISM EMPLOYING SAME

(75) Inventors: Wenshuai Liao, Beijing (CN); Yiming Zhao, Beijing (CN)

(73) Assignee: Analog Devices, Inc., Norwood, MA (US)

( * ) Notice: Subject to any disclaimer, the term of this patent is extended or adjusted under 35 U.S.C. 154(b) by 213 days.

(21) Appl. No.: 11/431,114

(22) Filed: May 9, 2006

(65) Prior Publication Data

US 2006/0268447 A1 Nov. 30, 2006

Related U.S. Application Data

(60) Provisional application No. 60/679,003, filed on May 9, 2005.

(51) Int. Cl.
*G11B 21/02* (2006.01)
(52) U.S. Cl. ..................... 360/75
(58) Field of Classification Search ............. 360/75, 360/69; 340/669; 73/510, 200, 488; 702/141; 600/534
See application file for complete search history.

(56) References Cited

U.S. PATENT DOCUMENTS

| 5,227,929 | A | 7/1993 | Comerford | 360/75 |
| 5,426,545 | A | 6/1995 | Sidman et al. | 360/78.09 |
| RE35,269 | E | 6/1996 | Comerford | 360/75 |
| 5,982,573 | A * | 11/1999 | Henze | 360/75 |
| 6,046,877 | A | 4/2000 | Kelsic | 360/75 |
| 6,997,882 | B1 * | 2/2006 | Parker et al. | 600/534 |
| 7,059,182 | B1 * | 6/2006 | Ragner | 73/200 |
| 2004/0125493 | A1 | 7/2004 | Shimotono et al. | 360/75 |
| 2004/0252403 | A1 | 12/2004 | Wehrenberg | 360/75 |
| 2006/0070439 | A1 * | 4/2006 | Kwon et al. | 73/488 |
| 2006/0136168 | A1 * | 6/2006 | Nakamura et al. | 702/141 |
| 2006/0152842 | A1 * | 7/2006 | Pasolini et al. | 360/75 |
| 2006/0236761 | A1 * | 10/2006 | Inoue et al. | 73/510 |

(Continued)

FOREIGN PATENT DOCUMENTS

EP 0 655 736 11/1994

(Continued)

OTHER PUBLICATIONS

Liao et al., "Using Dual-Axis Accelerometers to Protect Hard Disk Drives," Analog Dialogue 39-11, http://www.analog.com/analogdialogue, 4 pages, Nov. 2005.

(Continued)

*Primary Examiner*—Fred F. Tzeng
(74) *Attorney, Agent, or Firm*—Bromberg & Sunstein LLP

(57) ABSTRACT

Embodiments of the present invention employ differential acceleration computations for detecting free fall conditions. The differential acceleration computations can be based on two-axis or three-axis acceleration measurements, and therefore can be implemented using a two-axis accelerometer or a three-axis accelerometer (or combinations of accelerometers that enable acceleration measurements in two or three axes). When a free fall condition is detected, an appropriate signal can be generated, for example, to place a HDD in a protected state before damage is likely to occur. Differential acceleration measurements can also be used to detect a "safe" condition following a free fall condition.

23 Claims, 16 Drawing Sheets

U.S. PATENT DOCUMENTS

2007/0030159 A1* 2/2007 Stoev et al. ................ 340/669

FOREIGN PATENT DOCUMENTS

| EP | 0 658 894 | 6/1995 |
| JP | 06 324067 | 11/1994 |
| JP | 02536985 B2 | 8/1996 |
| JP | 02536985 Y2 | 9/1997 |
| WO | WO 2006/060077 | 6/2006 |

OTHER PUBLICATIONS

*Patent Abstracts of Japan*, vol. 1995, No. 02, Mar. 31, 1995, 1 Page—JP 06 324067 A (Yamatake Honeywell Co. Ltd., Nov. 25, 1994).

Authorized Officer Christoph Felicetti, *International Search Report and Written Opinion of the International Searching Authority*, International Application No. PCT/US2006/018247, International Searching Authority, Oct. 11, 2006, 11 Pages.

* cited by examiner

ACCELEROMETER-BASED DIFFERENTIAL FREE FALL DETECTION SYSTEM, APPARATUS, AND METHOD AND DISK DRIVE PROTECTION MECHANISM EMPLOYING SAME

PRIORITY

The present application claims priority from U.S. Provisional Patent Application No. 60/679,003 entitled DISK DRIVE PROTECTION SYSTEM, APPARATUS, AND METHOD, which was filed on May 9, 2005 in the names of Wenshuai Liao and Yiming Zhao, and is hereby incorporated herein by reference in its entirety.

FIELD OF THE INVENTION

The present invention relates generally to free fall detection, and, more particularly, to an accelerometer-based differential free fall detection system, apparatus, and method and a disk drive protection mechanism employing same.

BACKGROUND OF THE INVENTION

Hard disk drives (HDDs) are becoming more widely used than ever before, due to the explosive growth in the introduction of portable equipment such as laptop computers, portable media players (PMPs), and handsets. As more and more devices incorporate HDDs, the need has become more pressing to protect them from shocks produced by severe impacts when a product that contains one is dropped accidentally. To increase the ability of HDDs to survive such events, their impact resistance must be enhanced.

There are generally two approaches to establishing the necessary impact resistance, active and passive.

Passive approaches have been in use for a long time; they simply cushion the device with impact-absorbing materials, usually rubber or gels. Gels, which tend to be better able to absorb an impact, are more widely used than rubber. However, gels cannot protect devices from damage caused by falls of more than one meter; this precludes their use in portable entertainment equipment. Devices such as handsets, MP3 players, and PMPs need to be protected for a drop of more than 1.5 meters (the average height of a human ear above the ground). A passive approach to HDD protection is described in Naoki Asakawa, "Tech Analysis: HDD for Mobile Phones Withstand 1.5-Meter Drop," Nikkei Electronics Asia, January 2005, which is hereby incorporated herein by reference in its entirety.

Among active approaches, there are generally two alternatives for protecting HDDs. One is to increase cache memory capacity so that the HDD is in a read or write mode less often. This approach would also tend to reduce power consumption and heating, but it is costly and fails to deal with the impact that can occur should the HDD be in a read or write mode at the instant the fall begins. The second approach is to employ accelerometers to detect a drop and then generate a signal that causes an HDD head to be recalled to a safe zone. If this can occur before the product hits the floor or other stationary surface, a collision between head and platter will be prevented. This approach was first used commercially in a notebook PC released by IBM in October 2003.

A simple model for free fall of an object is depicted in FIG. 1, where the Z axis of the falling object is assumed to be perpendicular to the surface of the earth. In FIG. 1(*a*), the object is assumed to be stationary, so that the accelerations along the X and Y axes are both zero, hence the force along the Z axis, governed by Newton's second law, will have the value of 1 g (32.174 feet/second/second at sea level), corresponding to the stationary acceleration force due to gravity.

In FIG. 1(*b*) the object is allowed to fall. The accelerations along the X and Y axes remain the same, zero g, but now the accelerometer that measures acceleration along the Z axis, being accelerated at the same rate as the object to which it is fastened, will record a value of zero g.

A more general case for a falling object is shown in FIG. 2. Here the edges of the cube form arbitrary angles with regard to the orthogonal coordinate system.

In FIG. 2(*a*), the object is depicted in a generalized arbitrary orientation; its edges form angles $\alpha$, with respect to the X axis; $\beta$, with respect to the Y axis; and $\gamma$, with respect to the Z axis. At zero-g acceleration, the voltage output of each axis sensor is $V_{CC}/2$. Accordingly, the outputs for the three axes will be:

$$X\text{output} = V_{CC}/2 \pm [(\text{sensitivity})(1\ g)(\sin \alpha)] \quad (1a)$$

$$Y\text{output} = V_{CC}/2 \pm [(\text{sensitivity})(1\ g)(\sin \beta)] \quad (1b)$$

$$Z\text{output} = V_{CC}/2 \pm [(\text{sensitivity})(1\ g)(\sin \beta)(\cos \gamma)] \quad (1c)$$

"Sensitivity" refers to the output of the sensor per g. For the ADXL320, when powered by +3 V, the sensitivity will be 174 mV/g. If the direction of the detected linear acceleration corresponds with the positive direction of a coordinate axis—X, Y, or Z—its sign will be positive and its output will add to $V_{CC}/2$; otherwise it will be negative and will subtract from $V_{CC}/2$.

When the object is dropped suddenly, the accelerations along all three axes become zero because, regardless of the orientation of the object to the coordinate system, no acceleration will be detected along any axis since, as explained above, the accelerometer is accelerating towards the earth at the same rate as the falling body.

For portable equipment, we must also consider any angular acceleration that may be imparted to the object, as shown in FIG. 3.

In order to simplify the calculation of the angular acceleration, the analysis will be confined to the plane determined by the X and Y axes, thereby simplifying the analysis.

If the angular velocity is $\omega$ and the radius of rotation is R, then the angular acceleration ($A_C$) is:

$$A_C = \omega^2 R \quad (2)$$

Therefore, the components of the angular acceleration along the X and Y axes will be:

$$A_{CX} = \omega^2 R \sin \theta \quad (3a)$$

$$A_{CY} = \omega^2 R \cos \theta \quad (3b)$$

So, in reality, the falling body will generally exhibit both linear acceleration and angular acceleration, a combination of the various cases discussed above.

To compute the time that will elapse when an object falls, starting with a velocity of zero perpendicular to the earth at the instant of the fall, we can use the following equation based upon Newton's second law of motion:

$$t = \sqrt{\frac{2h}{g}} \quad (4)$$

where h is the height of the fall and g is the gravitational acceleration, 32.174 feet/second/second. To get a sense of the time available to respond to a fall, we can assume a height of 3 feet. Using equation (4), time=432 ms.

Traditionally, the HDD protection algorithm has been based on free-fall modeling, as explained below, in which the outputs of the sensors contained in the accelerometers can be easily captured by a digital oscilloscope or other data sampling system.

A "test sled" can be assembled using two ADXL320 dual-axis accelerometers. The axes of the accelerometers are aligned with the X, Y, and Z axes, as depicted in FIG. 4, thereby providing values of acceleration along the X, Y, and Z coordinates. (The $Y_1$ output is redundant and is not used.) The outputs of the coordinate axes are sampled by a 12-bit ADC contained in an ADuC832 precision analog microcontroller, which integrates the sampled data and feeds it to an internal 8052-compatible core processor. The sampled data is then transferred to the computer—via an RS-232 interface—for analysis.

FIG. 5 shows the sequence of responses sensed by the two sensors. Values X and Y are supplied by one accelerometer, the values Z and $Y_1$ are supplied by the other accelerometer. Note also that the plot is divided into four consecutive intervals labeled: "static," "rollover," "free-fall drop," and "impact." The sampling interval, shown along the X axis, is determined by the ADC, which is clocked at 200 Hz for each variable, or one sample of each variable every 5 milliseconds. The Y-axis scale represents the values delivered by the 12-bit ADC in an Analog Devices ADuC832 smart-transducer front end, plotted for all four axes.

The test sled, placed at the edge of the table and caused to roll over, imparting angular acceleration—as depicted in FIG. 4—produces the rollover data shown in FIG. 5. (The Z-axis value, apparently not-equal-to-zero-g output in static mode, is caused by the unbalanced installation of the accelerometer.)

When the sled is pushed off the table, the values are all constant near their respective zero levels during this free-fall-drop interval, in line with the above assertion that during the free fall the outputs of all the accelerometers will be zero-g output. It might also be noted that the zero-g output for the accelerometers along different axes in the same time interval is not quite the same.

The traditional HDD protection algorithm is generally based on the data obtained in the arrangement just described. The system monitors the acceleration along the X, Y, and Z axes of the object. If the root-sum-of-squares value calculated from Equation 5 is equal to or less than the threshold value, a signal is sent to the computer associated with the HDD causing the head to park safely before the portable device collides with the floor.

$$\sqrt{X^2+Y^2+Z^2} \leq \text{Threshold} \tag{5}$$

The choice of the threshold value is governed by the specific response-time requirement, as well as the sensor's parameters—such as sensitivity, sensitivity change due to temperature, operation voltage, noise density, package alignment error, sensor resonant frequency and the working temperature range of the equipment. Normally, the threshold value can be determined from experiments, like the one described above. For example, a designer might choose a threshold value of 0.4 g.

U.S. Reissue Pat. No. RE 35,269 describes a disk drive protection scheme that uses a three-axis accelerometer. This reissue patent and its parent, U.S. Pat. No. 5,227,929, are hereby incorporated herein by reference in its entirety.

As the name implies, a three-axis accelerometer can detect accelerations in each of three axes, typically referred to as the X, Y, and Z axes. The X, Y, and Z axes are typically normal to one another. A drop or fall condition may be detected using a three-axis accelerometer by measuring the X, Y, and Z axis accelerations and computing the square root of the sum of the squares of the X, Y, and Z axis acceleration measurements. If that value is less than a predetermined threshold (say, less than 0.4 g), a drop or fall condition may be inferred and a disk protection mechanism may be activated.

Three-axis accelerometers are typically expensive and large. Also, the above-mentioned algorithm for detecting a drop or fall may fail if the device is spinning as it drops or falls.

SUMMARY OF THE INVENTION

In accordance with one aspect of the invention there is provided a method for signaling a free fall condition. The method involves measuring acceleration for each of a plurality of axes in each of a plurality of successive sample periods; computing an acceleration delta for each axis for each of the plurality of successive sample periods, wherein each acceleration delta represents a change in acceleration between two successive sample periods; computing, for each of the plurality of successive sample periods, a sum of the squares of the acceleration deltas from that sample period; and signaling a free fall condition, if the sum falls within a first predetermined range for each of a first predetermined number of consecutive sample periods.

The method may involve measuring acceleration for two or three axes. The first predetermined range may include values exceeding a first predetermined threshold.

The method may also involve placing a device, such as a hard drive, in a protected state based upon the free fall condition signal. The method may also involve, subsequent to signaling the free fall condition, testing for a safe condition and signaling the safe condition, wherein the safe condition is characterized by the sum falling within a second predetermined range for each of a second predetermined number of consecutive sample periods. The second predetermined range may include values less than or equal to a second predetermined threshold. The method may also involve, prior to testing for the safe condition, testing for an impact condition in which the sum falls within a predetermined impact range for at least one sample period and testing for the safe condition only after detecting the impact condition.

In accordance with another aspect of the invention there is provided apparatus including an accelerometer arrangement providing acceleration outputs for each of a plurality of axes and a free fall detector in communication with the acceleration outputs. The free fall detector is configured to measure acceleration for each of the plurality of axes in each of a plurality of successive sample periods based on the acceleration outputs; compute an acceleration delta for each axis for each of the plurality of successive sample periods, wherein each acceleration delta represents a change in acceleration between two successive sample periods; compute, for each of the plurality of successive sample periods, a sum of the squares of the acceleration deltas from that sample period; and signal a free fall condition if the sum falls within a first predetermined range for each of a first predetermined number of consecutive sample periods.

Embodiments of the present invention may include a single two-axis accelerometer for providing acceleration outputs for each of two axes, a single three-axis accelerometer for providing acceleration outputs for each of three axes, or a plurality of accelerometers for providing acceleration outputs for each of the plurality of axes. The first predetermined range may include values exceeding a first predetermined threshold. The apparatus may also include a device, such as a hard drive, operably coupled to enter a protected state in response to the signal indicating the free fall condition. The free fall detector may be further configured to test for a safe condition subsequent to signaling the free fall condition and signal the safe condition, wherein the safe condition is characterized by the sum falling within a second predetermined range for each of a second predetermined number of consecutive sample periods. The second predetermined range may include values less than or equal to a second predetermined threshold. The free fall detector may be further configured to test for an impact condition prior to testing for the safe condition and test for the safe condition only after detecting the impact condition, wherein the impact condition is characterized by the sum falling within a predetermined impact range for at least one sample period. In various embodiments, the apparatus may be a portable computer, a portable media player, or a handset.

In accordance with another aspect of the invention there is provided a computer program product for detecting a free fall condition. The computer program product includes first program code for measuring acceleration for each of a plurality of axes in each of a plurality of successive sample periods; second program code for computing an acceleration delta for each axis for each of the plurality of successive sample periods, wherein each acceleration delta represents a change in acceleration between two successive sample periods; third program code for computing, for each of the plurality of successive sample periods, a sum of the squares of the acceleration deltas from that sample period; and fourth program code for signaling a free fall condition, if the sum falls within a first predetermined range for each of a first predetermined number of consecutive sample periods.

Embodiments may additionally include fifth program code for testing for a safe condition subsequent to signaling the free fall condition and signaling the safe condition, wherein the safe condition is characterized by the sum falling within a second predetermined range for each of a second predetermined number of consecutive sample periods. Embodiments may additionally include sixth program code for testing for an impact condition and enabling such testing for the safe condition only after the impact condition is detected, wherein the impact condition is characterized by the sum falling within a predetermined impact range for at least one sample period.

BRIEF DESCRIPTION OF THE DRAWINGS

The foregoing and advantages of the invention will be appreciated more fully from the following further description thereof with reference to the accompanying drawings wherein:

FIG. 14 is a logic flow diagram showing exemplary differential free fall logic in accordance with an exemplary embodiment of the present invention, wherein:

DETAILED DESCRIPTION OF SPECIFIC EMBODIMENTS

Embodiments of the present invention employ differential acceleration computations rather than absolute acceleration computations for detecting free fall conditions. The differential acceleration computations can be based on two-axis or three-axis acceleration measurements, and therefore can be implemented using a two-axis accelerometer or a three-axis accelerometer (or combinations of accelerometers that enable acceleration measurements in two or three axes). When a free fall condition is detected, an appropriate signal can be generated, for example, to place a HDD in a protected state before damage is likely to occur. Differential acceleration measurements can also be used to detect a "safe" condition following a free fall condition.

In a two-axis embodiment, a free fall condition is considered to be present when the value calculated from Equation 6a or Equation 6b (depending on the orientation of the two-axis accelerometer, and using the nomenclature of FIG.

4) is greater than a predetermined threshold value for a predetermined number of consecutive sample periods.

$$(dX/dt)^2+(dY/dt)^2 > \text{Threshold} \quad (6a)$$

$$(dZ/dt)^2+(dY_1/dt)^2 > \text{Threshold} \quad (6b)$$

In a three-axis embodiment, a free fall condition is considered to be present when the value calculated from Equation 7 is greater than a predetermined threshold value for a predetermined number of consecutive sample periods.

$$(dX/dt)^2+(dY/dt)^2+(dZ/dt)^2 > \text{Threshold} \quad (7)$$

An exemplary embodiment is now described with reference to a two-axis embodiment.

Figure 6:
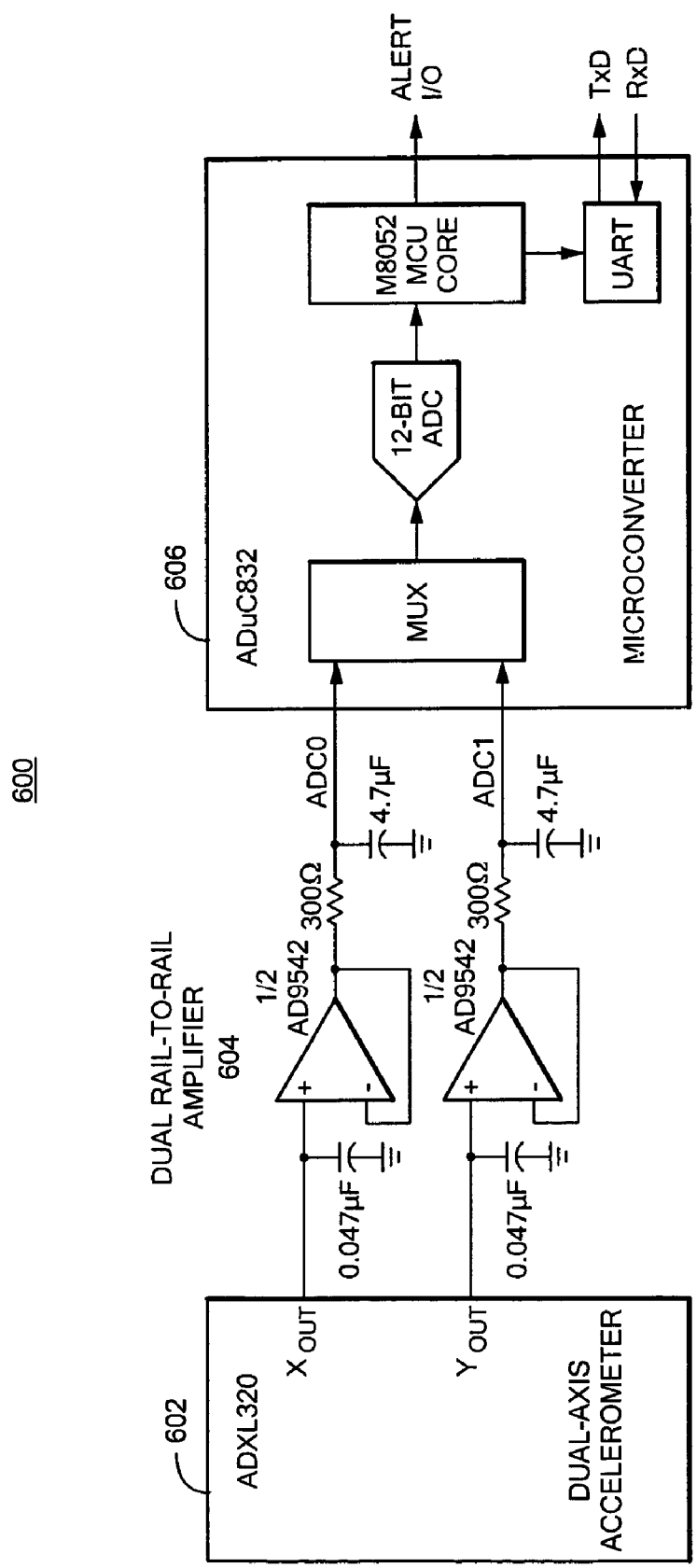
FIG. 6 is a simplified schematic diagram for a free fall detector employing a single two-axis accelerometer, in accordance with an exemplary embodiment of the present invention.

FIG. 6 is a simplified schematic diagram for a free fall detector 600 employing a single two-axis accelerometer, in accordance with an exemplary embodiment of the present invention. The principal components of this free fall detector are an ADXL320 dual-axis accelerometer 602, an AD8542 dual rail-to-rail amplifier 604, and an ADuC832 smart transducer front end 606, all sold by Analog Devices, Inc.

Figure 7:
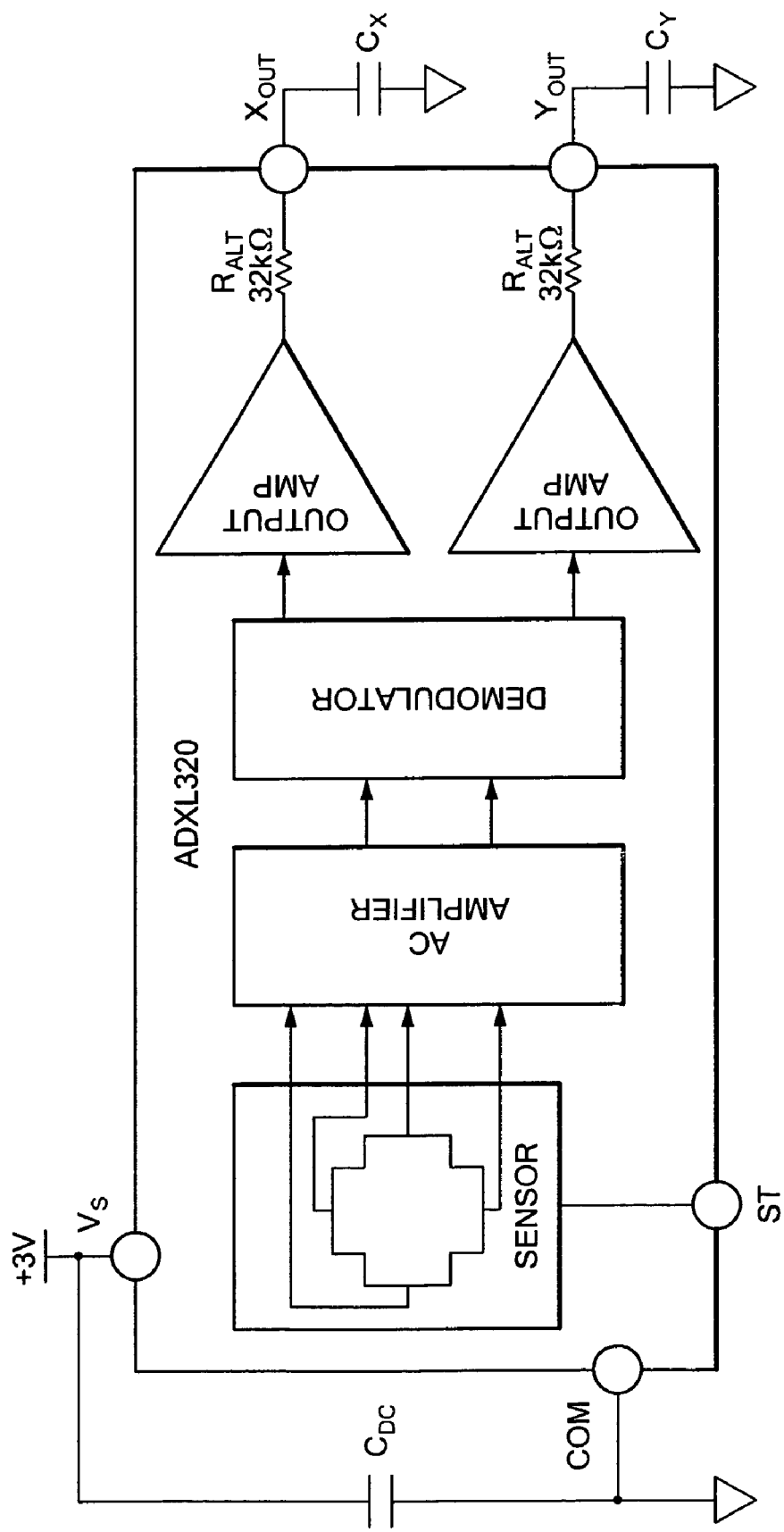
FIG. 7 is a simplified schematic diagram of an ADXL320 two-axis accelerometer, in accordance with an exemplary embodiment of the present invention.

FIG. 7 is a simplified schematic diagram of the ADXL320 two-axis accelerometer 602, in accordance with an exemplary embodiment of the present invention. The ADXL320 is a low-cost, low-power, dual-axis acceleration measuring system with signal-conditioned voltage outputs, all on a single monolithic IC. The product measures acceleration with a full-scale range of ±5 g (typical). The ADXL320 is housed in a very-thin, 4-mm×4-mm×1.45-mm, 16-lead plastic LFCSP. The accelerometer contains a sensor and signal-conditioning circuitry to implement an open-loop acceleration measurement architecture. The output signals are two analog voltages proportional to the orthogonal accelerations. The sensor is a polysilicon, surface-micromachined structure built on top of a silicon wafer. Polysilicon springs suspend the structure over the surface of the wafer and provide resistance against acceleration forces. Deflection of the structure is measured using a differential capacitor formed by fixed independent plates in relation to plates attached to the moving mass. The fixed plates are driven by square waves which are 180° out of phase. When the device is subjected to an acceleration force, the beams deflect, unbalancing the differential capacitor—which results in an output square wave with amplitude proportional to acceleration. Phase-sensitive demodulation circuitry, contained in the demodulator block in the illustration, is then used to rectify the signal and determine whether the acceleration is positive or negative. The demodulator's measured accelerations, along the X axis and Y axis of the ADXL320, are amplified by the output amplifiers and brought off-chip through 32-kΩ resistors, as shown in FIG. 7. External capacitors can be used to provide filtering.

Figure 8:
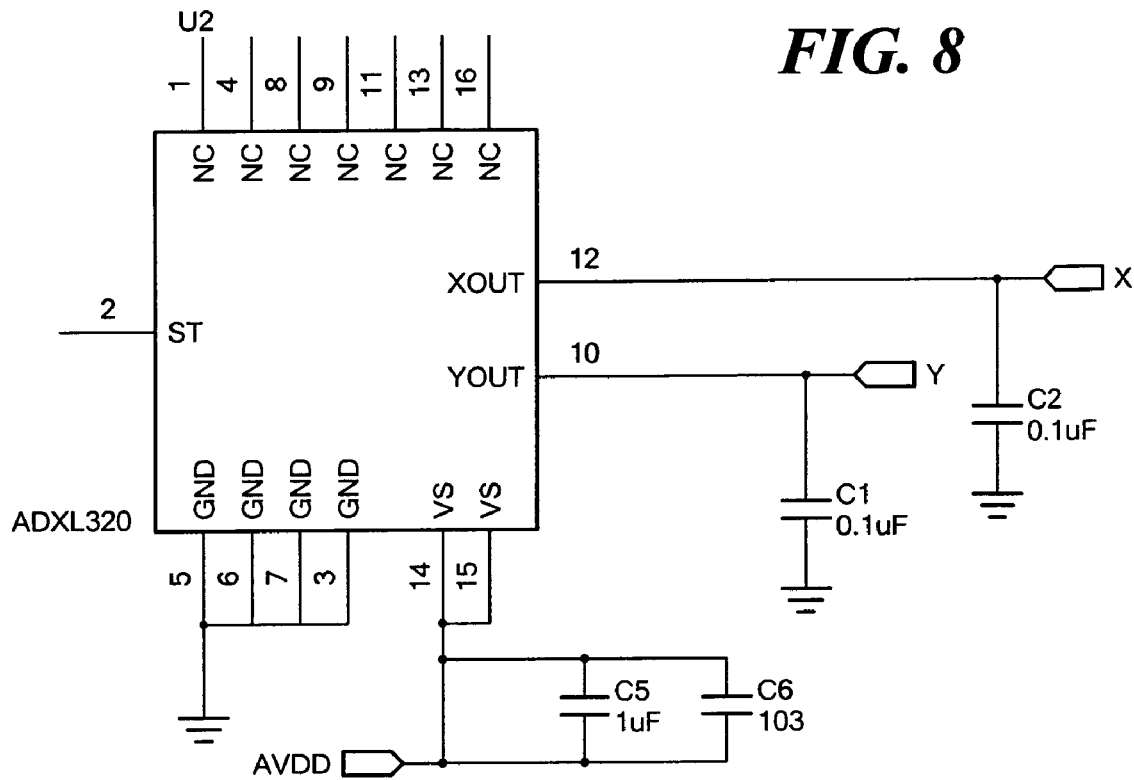
FIG. 8 is a schematic diagram for an ADXL320 accelerometer subsystem, in accordance with an exemplary embodiment of the present invention.

FIG. 8 is a schematic diagram for the ADXL320 accelerometer 602 subsystem, in accordance with an exemplary embodiment of the present invention. In this example, the output low pass filter is 50 Hz, Cfilter=0.1 uF, RMS noise=2.25 mg, and Peak-to-Peak noise=13.5 mg.

Figure 9:
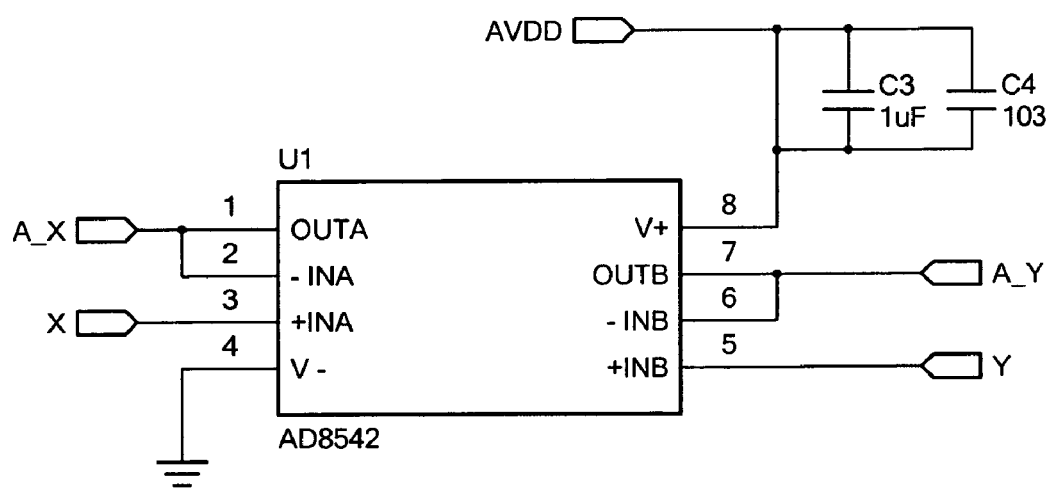
FIG. 9 is a schematic diagram for an AD8542 dual rail-to-rail amplifier subsystem, in accordance with an exemplary embodiment of the present invention.

FIG. 9 is a schematic diagram for the AD8542 dual rail-to-rail amplifier 604 subsystem, in accordance with an exemplary embodiment of the present invention. As mentioned above, the AD8542 dual rail-to-rail amplifier 604 is used to buffer the output of the ADXL320 accelerometer 602.

Figure 10:
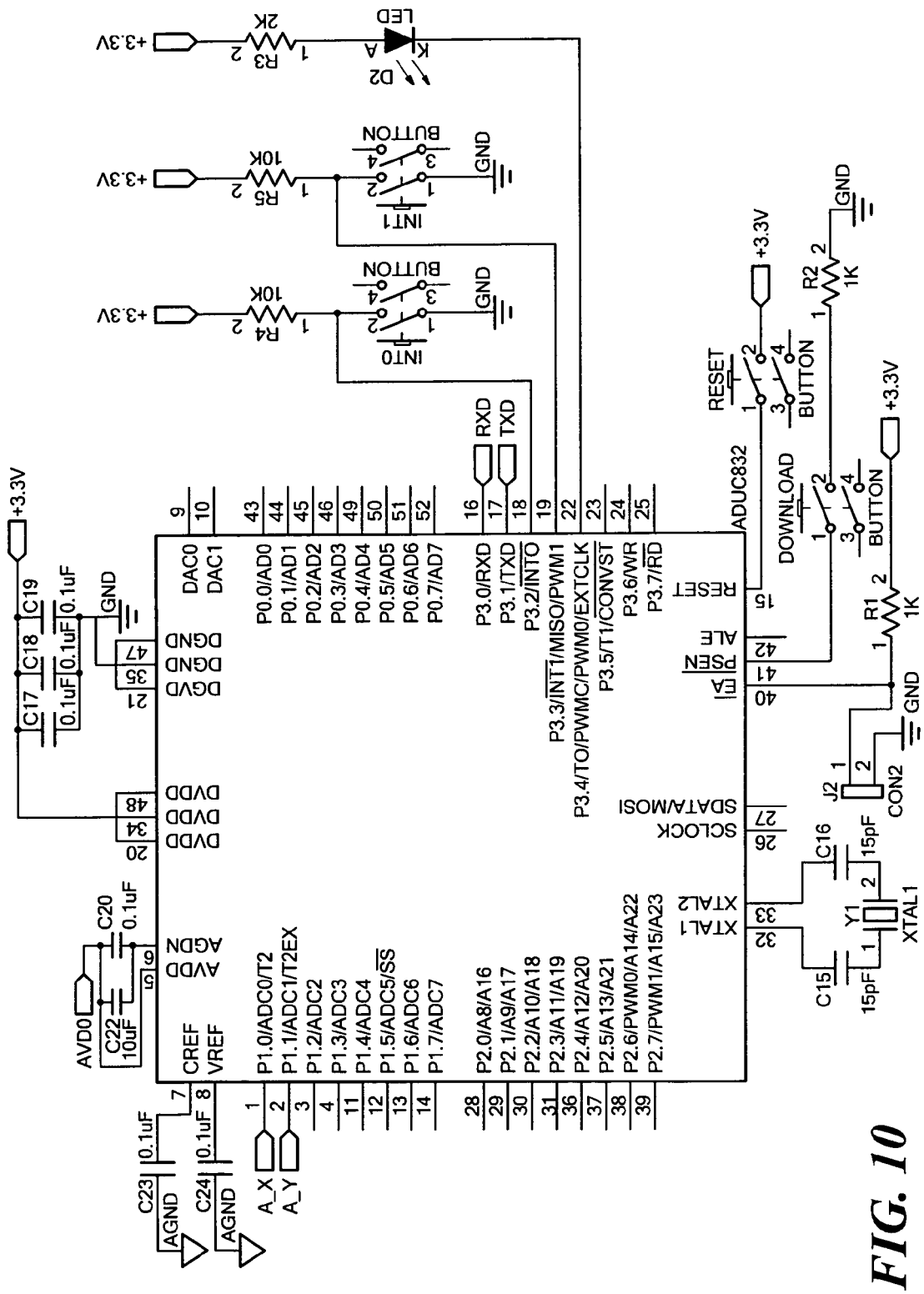
FIG. 10 is a schematic diagram for an ADuC832 smart transducer front end subsystem, in accordance with an exemplary embodiment of the present invention.

FIG. 10 is a schematic diagram for the ADuC832 smart transducer front end 606 subsystem, in accordance with an exemplary embodiment of the present invention. As mentioned above, two analog-to-digital converter (ADC) channels are used, namely ADC0 and ADC1. The ADuC832 smart transducer front end 606 includes a 12-bit SAR-type ADC that is shared by the two inputs via a multiplexer. Whenever a new input channel is selected by the multiplexer, a residual charge from 32 pF sampling capacitor places a transient on the newly selected input. A very fast op amp is used to drive each analog input in order to recover from this transient before the sampling switches click into "hold" mode. In this example, other resources of the ADuC832 smart transducer front end 606 that are used include the UART port (for serial port download), /INT0 used for debugging, and a general I/O pin used for the output signal.

Figure 11:
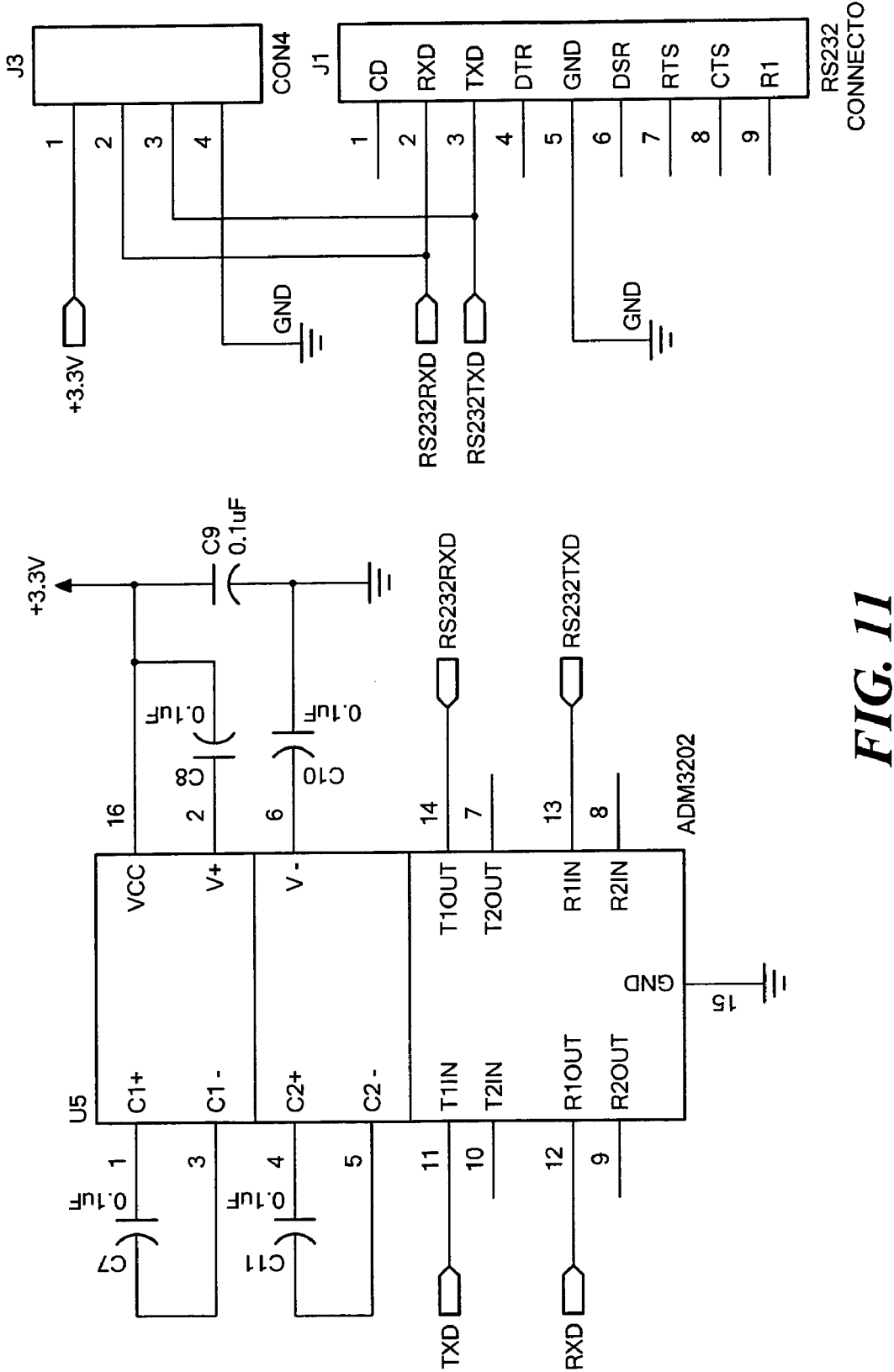
FIG. 11 is a schematic diagram for a serial port download subsystem, in accordance with an exemplary embodiment of the present invention.

FIG. 11 is a schematic diagram for the serial port download subsystem, in accordance with an exemplary embodiment of the present invention. This subsystem includes an RS232 connector (J1) with an extra 232 level shifter (ADM3202) and a 4-pin connector using an Analog Devices, Inc. MicroConverter Download line (J3).

Figure 12:
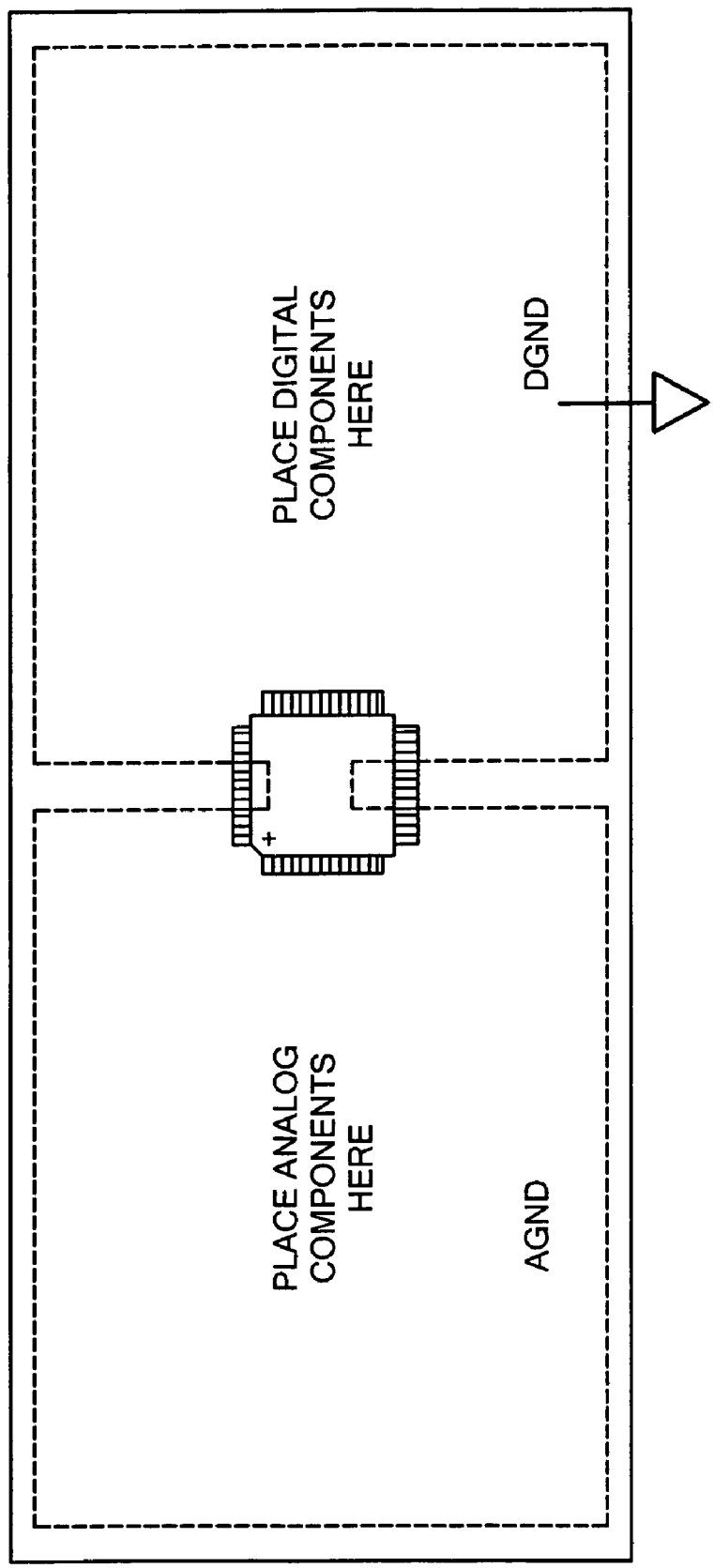
FIG. 12 is a schematic diagram showing the general layout of a free fall detection system, in accordance with an exemplary embodiment of the present invention.

FIG. 12 is a schematic diagram showing the general layout of the system, in accordance with an exemplary embodiment of the present invention. It should be noted that the system is a typical mixed signal processing environment including both analog and digital circuits. Therefore, the power supply is separated into +3.3V and AVDD, with +3.3V used for the digital circuits, and AVDD used for analog parts. Also the ground is separated into analog ground, AGND, and digital ground, GND. Special attention should be paid to grounding and the layout of the ADuC832 smart transducer front end 606 subsystem in order to achieve optimum performance from the ADC and DAC. Specifically, the circuit board layout should avoid digital currents flowing under analog circuitry. In this exemplary embodiment, the analog circuitry and the digital circuitry are placed on opposite sides of the ADuC832 smart transducer front end 606, with AGND and GND connected at the center of the ADuC832 smart transducer front end 606 on the bottom layer.

Figure 13:
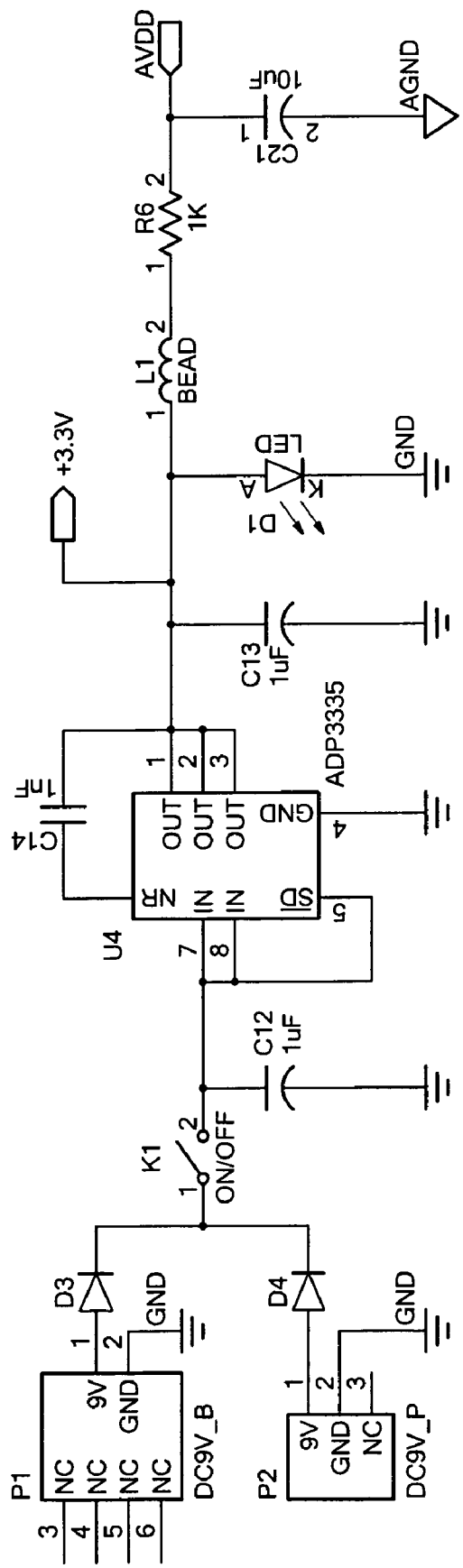
FIG. 13 is a schematic diagram for a power supply subsystem, in accordance with an exemplary embodiment of the present invention.

FIG. 13 is a schematic diagram for the power supply subsystem, in accordance with an exemplary embodiment of the present invention. Here, an ADP3335ARM-3.3 provides the DC-DC function from 9V-DC to the 3.3V power supply. The analog power, AVDD, is generated from +3.3V through a ferrite bead and a 10 uF capacitor. The power supply can be a 9V battery or DC socket. K1 is used to switch on and off the system power. Led D1 is power supply +3.3V indication.

With reference again to FIG. 6, the signals from the accelerometer 602 are fed via the dual rail-to-rail amplifier 604 to the inputs ADC0 and ADC1 of the smart transducer front end 606. The dual rail-to-rail amplifier 604 serves as a buffer between the outputs of the accelerometer 602 and the inputs of the smart transducer front end 606. In an exemplary embodiment, a multiplexer 607, which is a component of the ADuC832 smart transducer front end 606, switches between the two inputs at a rate of 200 samples per second for each channel to monitor the arriving acceleration signals. The 8052 microcontroller core 608, which is a component of the ADuC832 smart transducer front end 606, implements differential free fall detection logic in software, as discussed in more detail below with reference to FIG. 8. Whenever a free fall condition is detected, an alert signal 610 is generated via a general I/O pin. In this example, the alert signal 610 is used to drive an LED. It will be realized, however, that the alert signal 610 could, for example, be fed to a disk drive controller so that the disk drive will safely park the hard-disk-drive head before an impact occurs.

FIG. 14 is a logic flow diagram showing exemplary differential free fall logic 800 in accordance with an exemplary embodiment of the present invention.

Figure 14A:
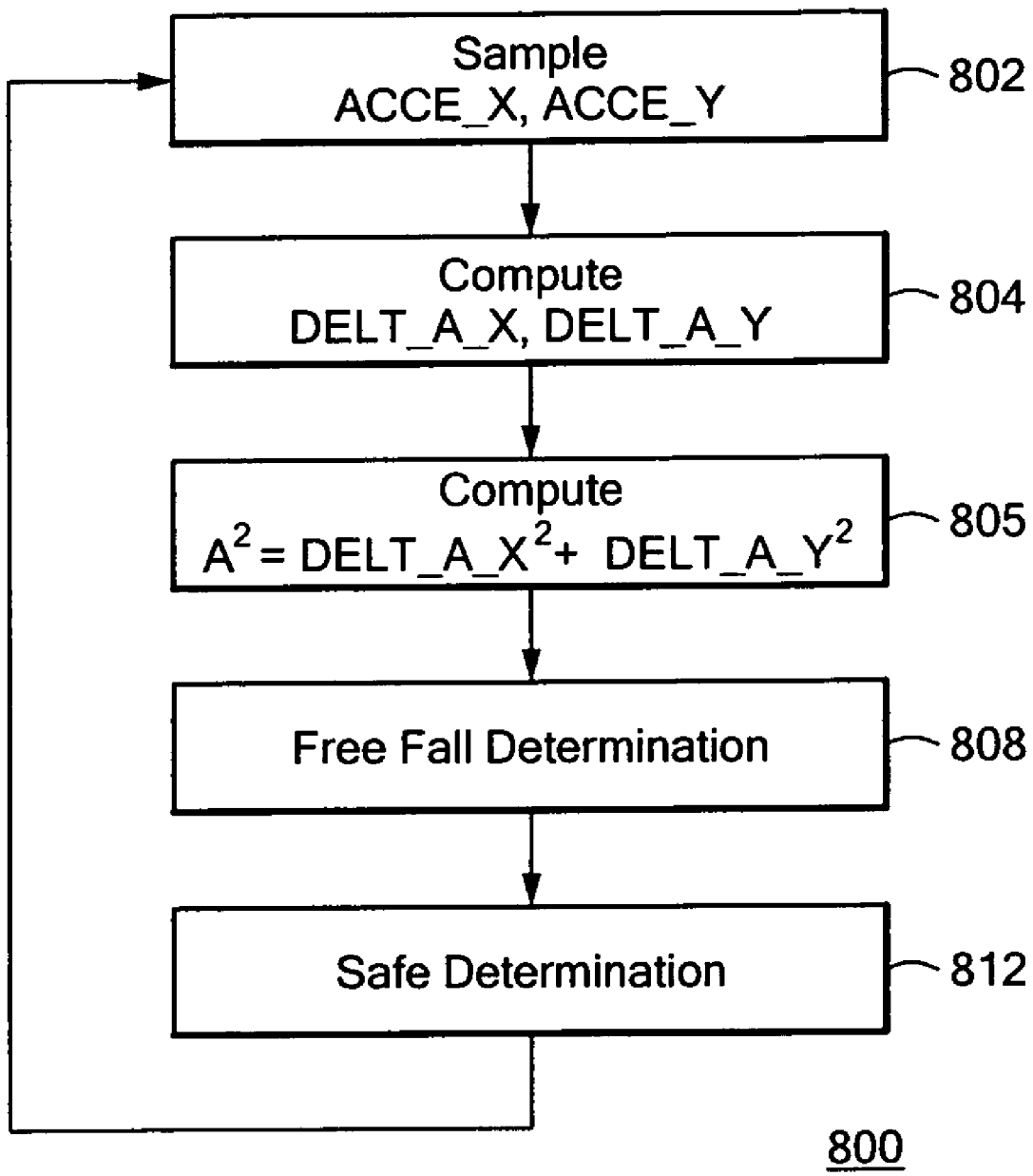
FIG. 14A shows the main control loop.

FIG. 14A is the main control loop. Specifically, each sample period, the logic 800 samples the X and Y axis accelerations (i.e., ACCE_X and ACCE_Y, respectively), in block 802. The logic 800 then computes the changes in X and Y axis accelerations from the previous sample period (i.e., DELT_A_X and DELT_A_Y, respectively), in block 804. The logic 800 then computes the sum of the squares of the time derivatives for each of the two axes (i.e., $A^2 = DELT\_A\_X^2 + DELT\_A\_Y^2$), in block 805. The logic 800 then performs free fall determination subroutine 808 and safe determination subroutine 812.

In this example, the free fall determination subroutine 808 and the safe determination subroutine 812 operate on a number of global variables, including a danger flag used to indicate whether the system is in a protected state (i.e., danger flag set) or an unprotected state (i.e., danger flag clear), a danger counter used to keep track of the number of consecutive samples in which the sum of the squares of the time derivatives for each of the two axes is greater than a first predetermined threshold (i.e., $A^2$>Threshold 1), and a safe counter used to keep track of the number of consecutive samples in which the sum of the squares of the time derivatives for each of the two axes is less than or equal to a second predetermined threshold (i.e., $A^2 \leq$ Threshold 2). It should be noted that Threshold and Threshold 2 could be set to the same value or to different values. The danger flag is initially cleared, and the danger counter and the safe counter are initially set to zero. A timer may also be used to ensure that the system does not remain indefinitely in a protected state.

Figure 14B:
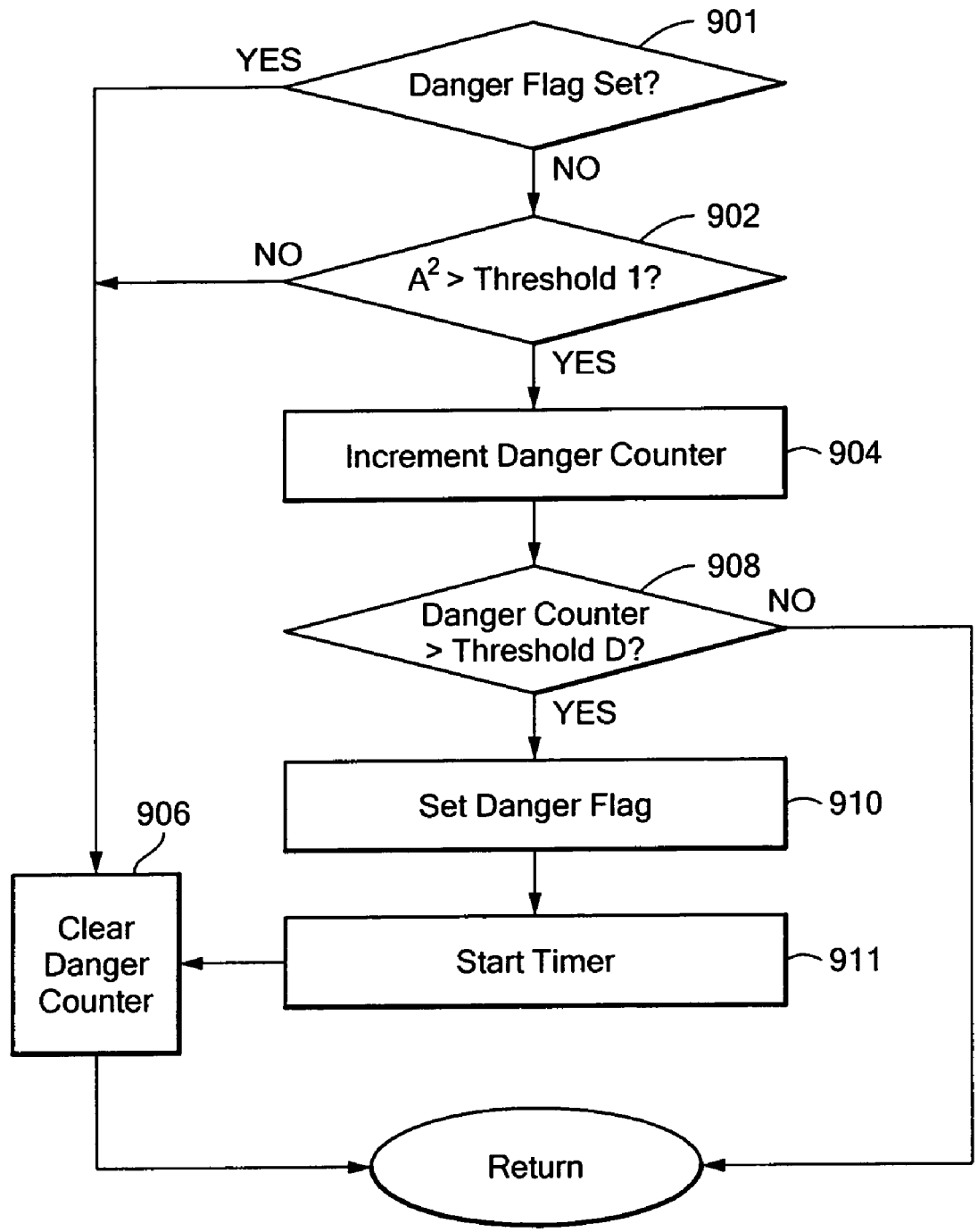
FIG. 14B represents a free fall determination subroutine.

FIG. 14B represents free fall determination subroutine 808. Specifically, in block 901, the logic 800 tests the danger flag. If the danger flag is set (YES in block 901), then the logic 800 clears the danger counter in block 906 and returns. If the danger flag is clear (NO in block 901), then the logic 800 checks whether $A^2$>Threshold 1, in block 902. If $A^2 \leq$ Threshold 1 (NO in block 902), then the logic 800 clears the danger counter in block 906 and returns. If $A^2$>Threshold 1 (YES in block 902), then the logic 800 increments the danger counter in block 904, and then checks whether the danger counter exceeds a predetermined danger threshold (i.e., danger counter>Threshold D) in block 908. If danger counter$\leq$Threshold D (NO in block 908), then the logic 800 returns. If danger counter>Threshold D (YES in block 908), then the logic 800 sets the danger flag in block 910 (i.e., placing the system in the protected state), starts a timer in block 911, clears the danger counter in block 906, and returns.

Figure 14C:
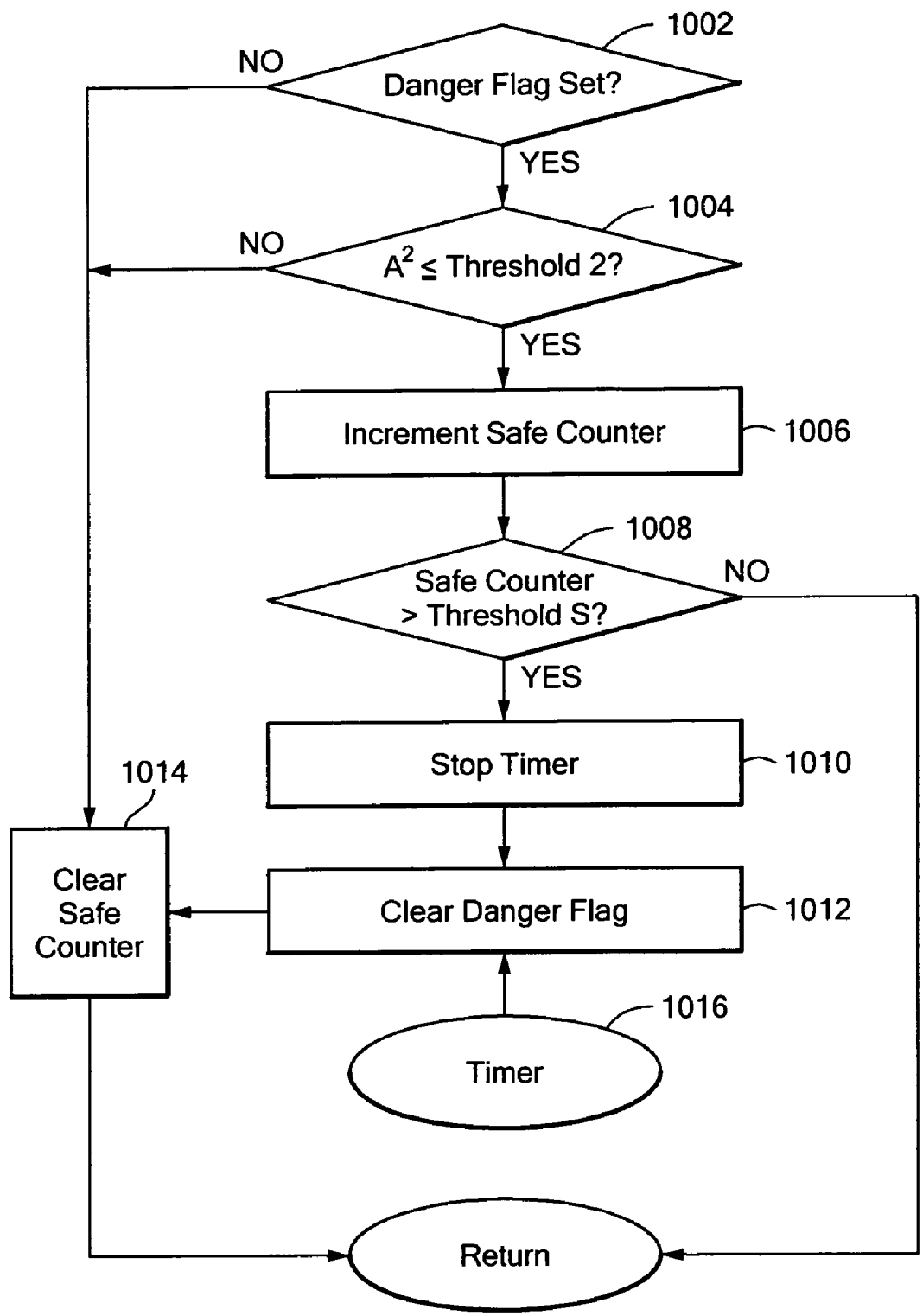
FIG. 14C represents a safe determination subroutine.

FIG. 14C represents safe determination subroutine 812. Specifically, in block 1002, the logic 800 tests the danger flag. If the danger flag is clear (NO in block 1002), then the logic 800 clears the safe counter in block 1014 and returns. If the danger flag is set (YES in block 1002), then the logic 800 checks whether $A^2 \leq$ Threshold 2, in block 1004. If $A^2$>Threshold 2 (NO in block 1004), then the logic 800 clears the safe counter in block 1014 and returns. If $A^2 \leq$ Threshold 2 (YES in block 1004), then the logic 800 increments the safe counter in block 1006, and then checks whether the safe counter exceeds a predetermined safe threshold (i.e., safe counter>Threshold S) in block 1008. If safe counter$\leq$Threshold S (NO in block 1008), then the logic 800 returns. If safe counter>Threshold S (YES in block 1008), then the logic 800 stops the timer in block 1010, clears the danger flag in block 1012, clears the safe counter in block 1014, and returns. Asynchronously, if and when the timer 1016 expires, the logic 800 clears the danger flag in block 1012, clears the safe counter in block 1014, and returns (if necessary, the timer could also be stopped).

In summary then, the logic 800 typically requires that the sum of the squares of the time derivatives for each of the two axes be greater than Threshold 1 for some number of consecutive sample periods (i.e., Threshold D) before declaring a free fall condition, such that even one sample period below the Threshold 1 can prevent a free fall condition from being declared. Once in a protected state, however, the logic 800 typically requires that the sum of the squares of the time derivatives for each of the two axes be less than or equal to Threshold 2 for some number of consecutive sample periods (i.e., Threshold S) before declaring a safe condition, such that multiple sample periods below the threshold may be required before a safe condition is declared.

It should be noted that the various thresholds are implementation specific, and may depend on a number of factors, including the types and responses of the accelerometers, the time needed to place a device in a protected state, the expected free fall time/distance, and other factors. In practice, Threshold 1 should be high enough to ignore accelerations caused by normal usage of the device (e.g., keyboard typing) but not so high as to miss legitimate free fall conditions. In an exemplary embodiment, Threshold 1 and Threshold 2 might be set to the same value, although they could be set to different values. Similarly, Threshold D should be high enough to avoid false reporting of free fall conditions due to short-term accelerations but low enough to permit reporting of a true free fall condition within an appropriate time. Threshold S should be high enough to avoid leaving the protected state prematurely but low enough to avoid overly lengthy stays in the protected state (during which times the hard disk would be inaccessible). Threshold D and Threshold S could be set to the same value or to different values. In an exemplary embodiment, Threshold S might be set to five times the value of Threshold D.

Figure 1:
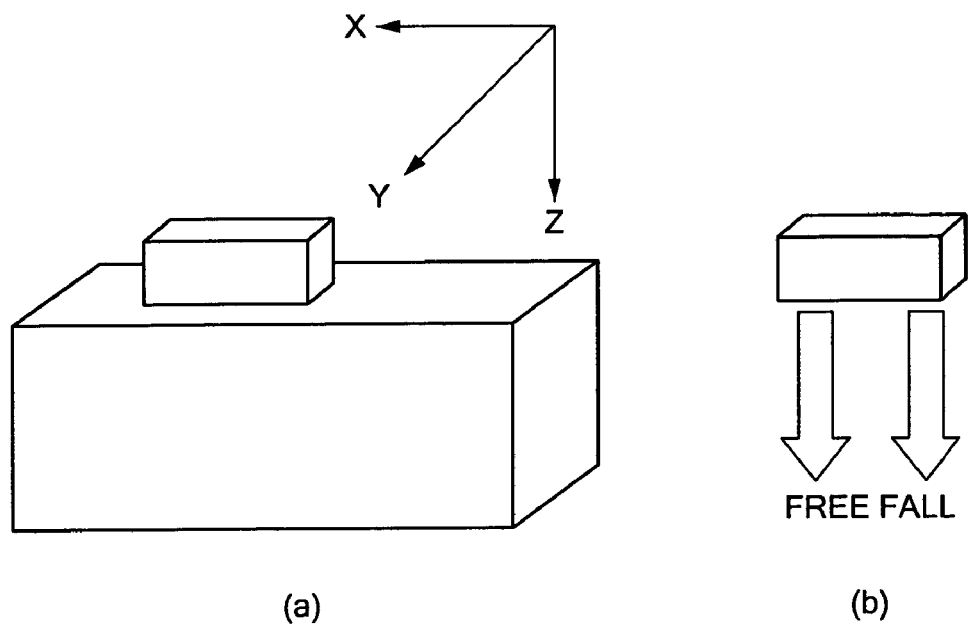
FIG. 1 shows a simple model for free fall of an object.
Figure 2:
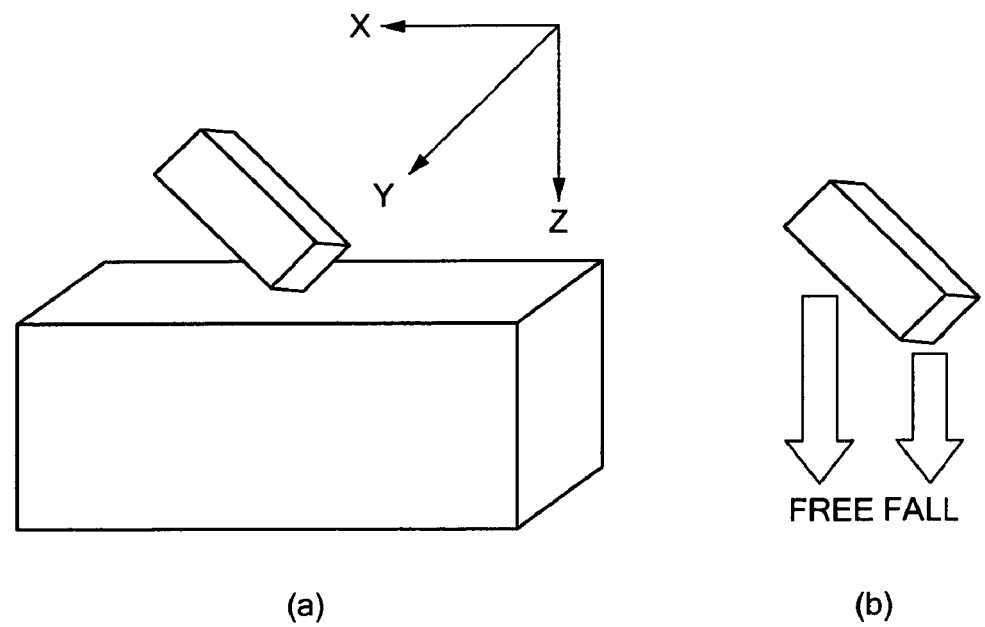
FIG. 2 shows a more general model for a falling object.
Figure 3:
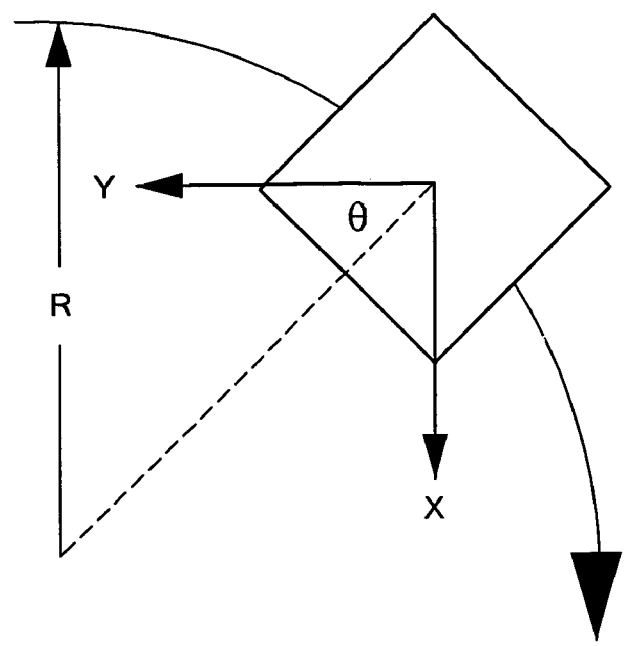
FIG. 3 shows a model for a falling object including angular acceleration.
Figure 4:
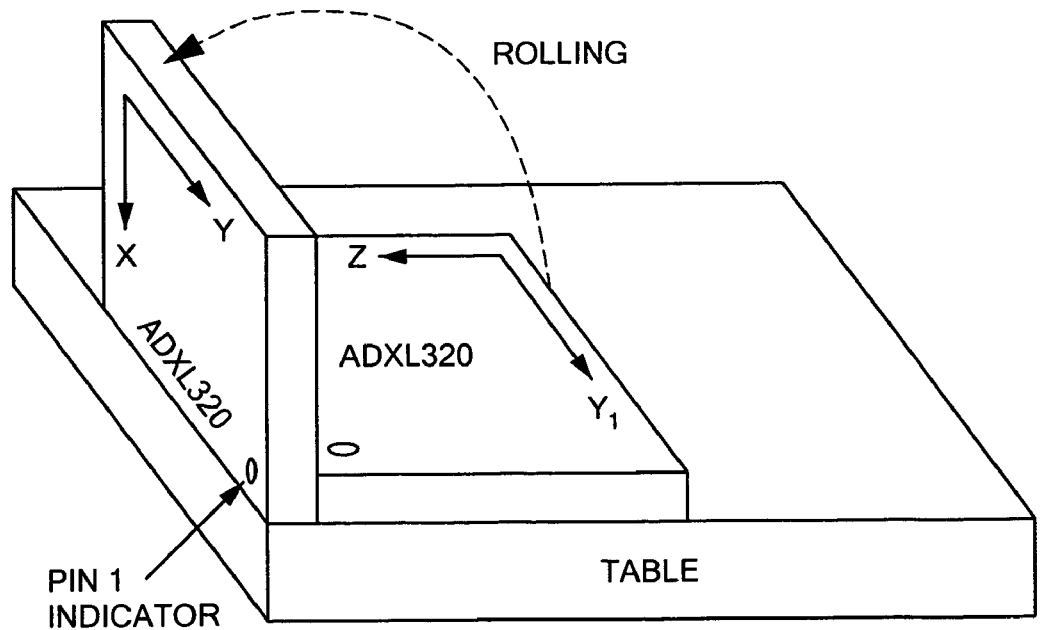
FIG. 4 shows an arrangement for three-axis acceleration measurements using a pair of two-axis accelerometers, as known in the art.
Figure 5:
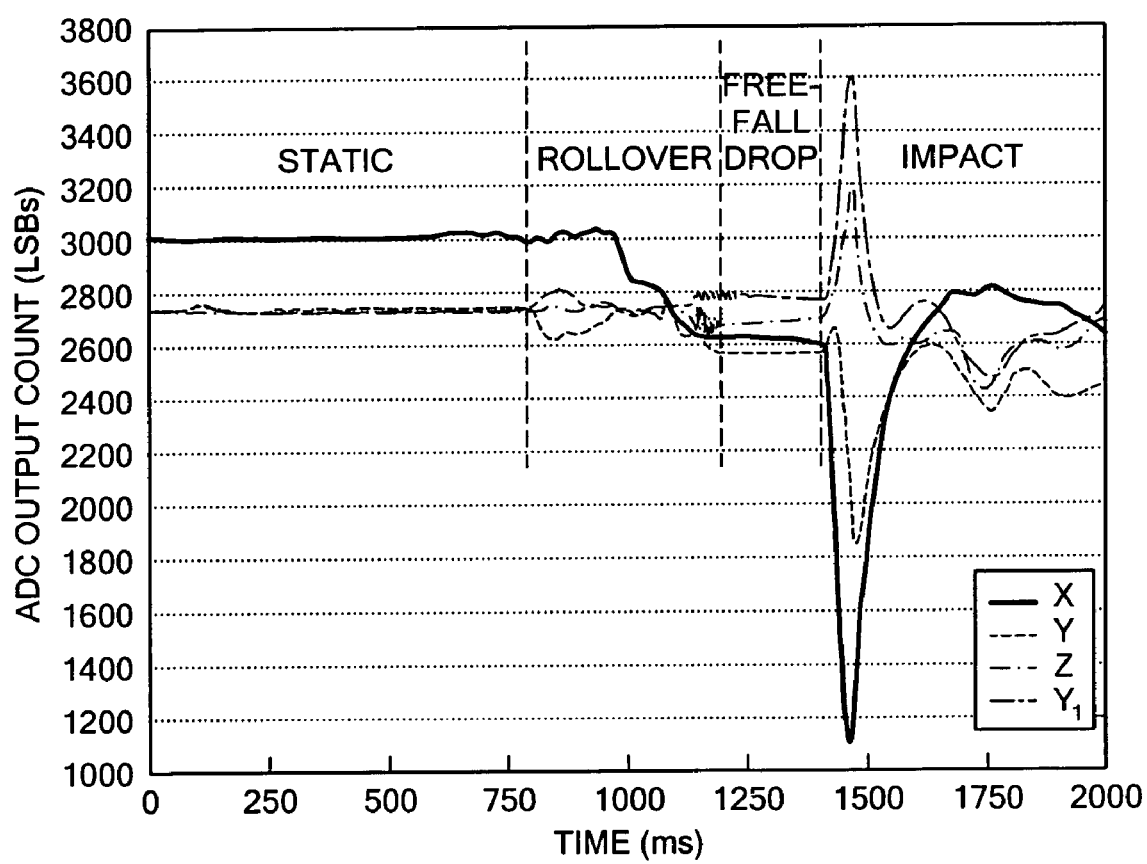
FIG. 5 shows a sequence of responses sensed by the two sensors shown in FIG. 4.

In the example shown above with reference to FIG. 4, and also with reference to FIG. 5, it can be seen that the sensor outputs do vary during the rollover interval, but the output values are not sufficiently pronounced to declare a free fall condition according to Equation 5. This is because Equation 5 is based on absolute measurements of X, Y, and Z accelerations, not on differentials.

Figure 15:
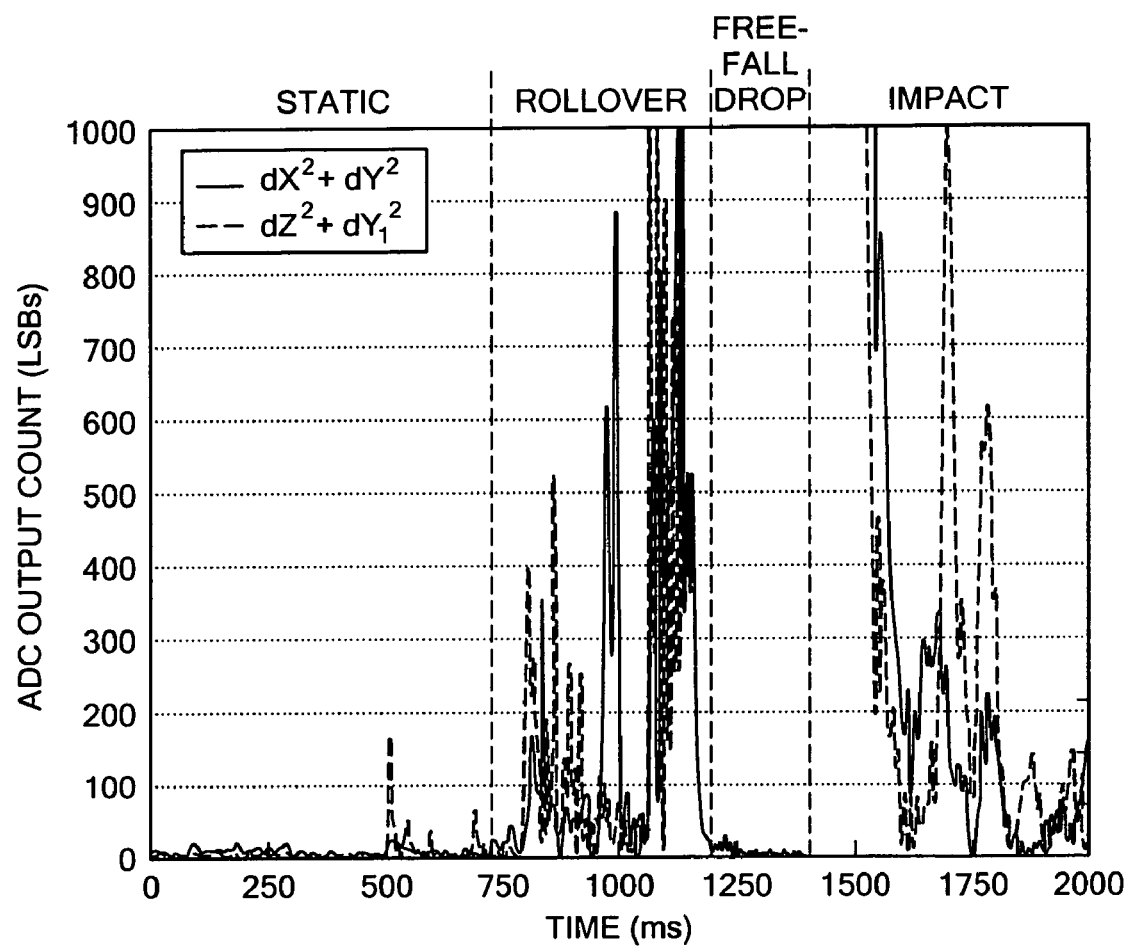
FIG. 15 is a graph showing the instant-by-instant values of the differential computations, in accordance with an exemplary embodiment of the present invention.

The rollover condition can be detected, however, using differential measurements of either of the two-axis accelerometers. FIG. 15 shows the instant-by-instant values of $(dX/dt)^2 + (dY/dt)^2$ (i.e., Equation 6a) and $(dZ/dt)^2 + (dY_1/dt)^2$ (i.e., Equation 6b). The values plotted in FIG. 15 are the results of calculations based on outputs from the 12-bit ADC in the ADuC832 smart transducer front end 608. The sample numbers are in 5-ms time increments. It can be seen that the sums of the squares of the time derivatives for both of the accelerometers (i.e., from Equations 6a and 6b) are quite large during the rollover time interval, although they become quite small during the free-fall drop. Thus, it is expected that either the X-Y accelerometer or the Z-Y accelerometer could be used successfully to detect a free fall condition.

Experience with the above-referenced system has shown that the response time between the instant a free fall occurs and the time the alert signal is generated can be around 40 milliseconds, with a sampling rate of 200 samples per second per channel and a sensor bandwidth of 100 Hz. The time required to park a hard-disk-drive head should not exceed 150 ms in order to lower the cost of the whole system. Therefore, the total time from a detected free fall to the completion of the parking should be no more than 190 ms. This is far less than the 432 ms that would take for a device to fall three feet.

Thus, it has been shown that a single two-axis accelerometer can be used to reliably detect free fall conditions using the differential technique described herein. Of course, there are certain scenarios in which a single two-axis accelerometer could fail to detect the free fall condition using the differential technique described herein, although it is expected that such scenarios will be unlikely in real-world implementations.

Therefore, in alternative embodiments of the present invention, the differential technique can be expanded for use with a three-axis accelerometer. Specifically, accelerations would be sampled for the three axes, and Equation 7 would be applied rather than Equation 6a or 6b. Otherwise, the logic for a three-axis implementation would be essentially the same as for a two-axis implementation.

Figure 16:
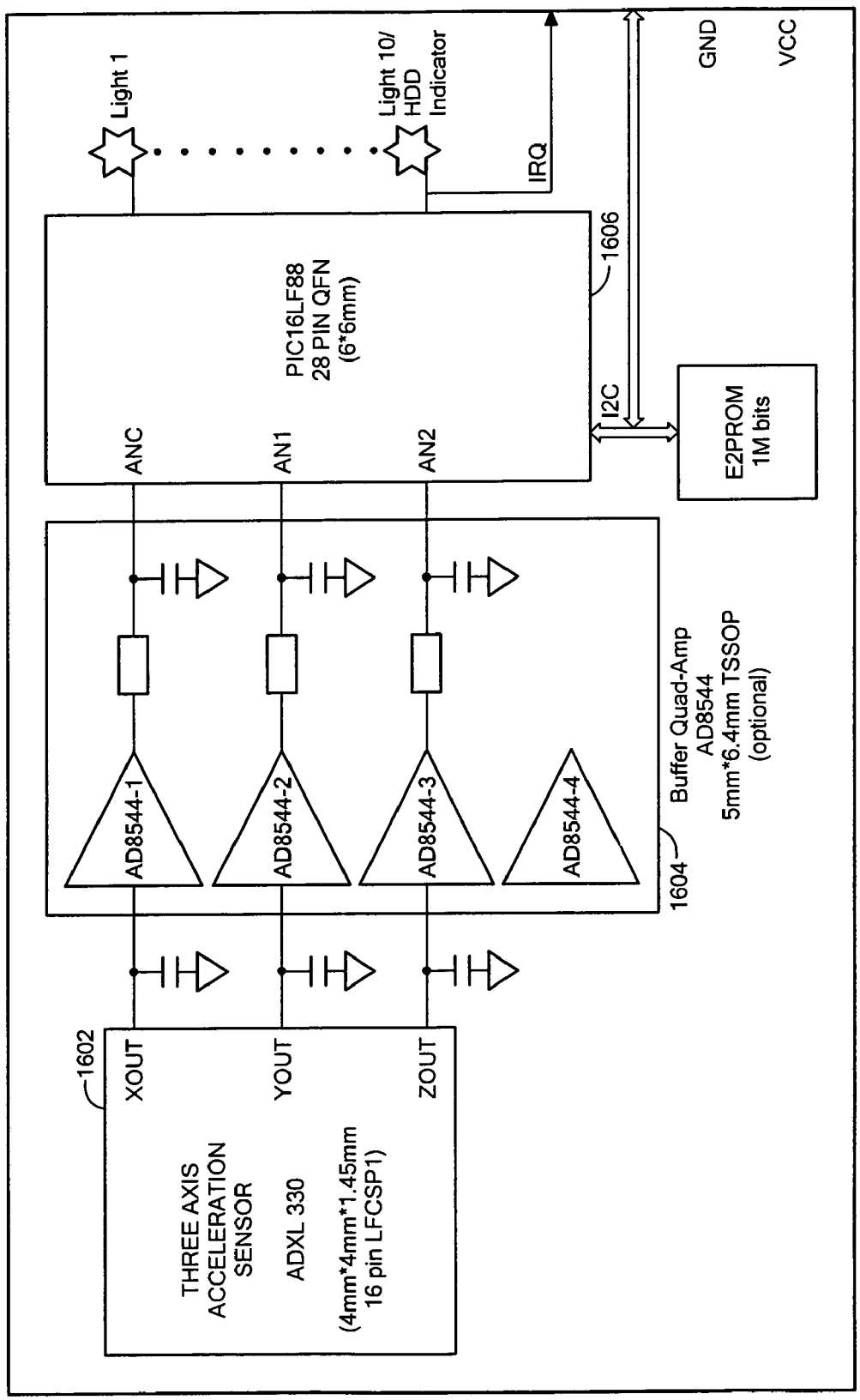
FIG. 16 is a simplified schematic diagram for a free fall detector employing a three-axis accelerometer, in accordance with an exemplary embodiment of the present invention.

FIG. 16 is a simplified schematic diagram for a free fall detector 1600 employing a three-axis accelerometer, in accordance with an exemplary embodiment of the present invention. The principal components of this free fall detector are an ADXL330 three-axis accelerometer 1602, an AD8544 quad rail-to-rail amplifier 1604, and a PIC16F88 microcontroller 1606.

The ADXL330 is a small, thin, low power complete three-axis accelerometer with signal conditioned voltage outputs, all on a single monolithic IC. The ADXL330 measures acceleration with a full-scale range of +/−2 g. The ADXL330 package is 4 mm×4 mm×1.45 mm, 16-lead, plastic LFCSP. It can be powered from 2.4V to 3.6V, so it is good for most portable applications. The ADXL330 generally only requires a power supply and a power supply decoupling capacitor. In order to reduce the Xout, Yout, and Zout noise in this example, three output capacitors are connected at the three outputs to limit the nose bandwidth. The relationship between the output filter bandwidth and the capacitor value is Bandwidth=1/(2*pi*32 Kohm*C). Considering the desired response time for this exemplary embodiment, 0.047 uF capacitors (corresponding to 105.8 Hz) are used.

The PIC16F88 microcontroller 1606 includes a 10-bit, seven-channel ADC. Three ADC channels are needed to convert the analog outputs of the accelerometer 1602 into digital signals. The PIC16F88 microcontroller 1606 also implements the free fall detection logic and generates any output signal.

Figure 17:
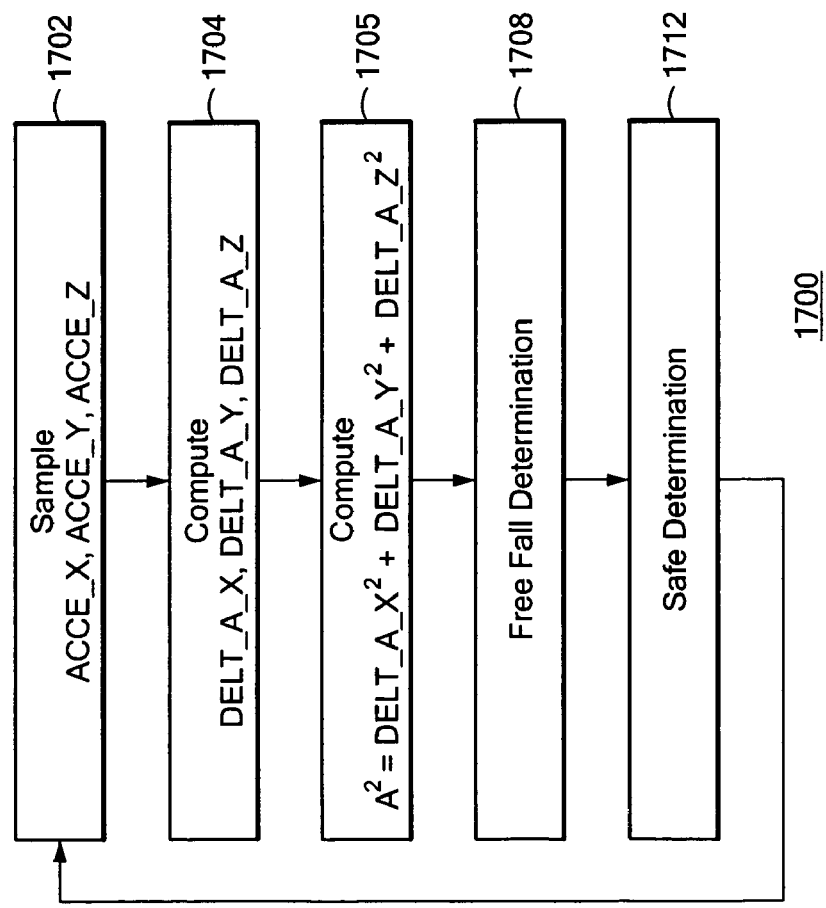
FIG. 17 shows the main control loop for a three-axis free fall detector, in accordance with an exemplary embodiment of the present invention.

FIG. 17 is the main control loop for a three-axis free fall detector, in accordance with an exemplary embodiment of the present invention. Specifically, each sample period, the logic 1700 samples the X, Y, and Z axis accelerations (i.e., ACCE_X, ACCE_Y, and ACCE_Z, respectively), in block 1702. The logic 1700 then computes the changes in X, Y, and Z axis accelerations from the previous sample period (i.e., DELT_A_X, DELT_A_Y, and DELT_A_Z, respectively), in block 1704. The logic 1700 then computes the sum of the squares of the time derivatives for each of the two axes (i.e., $A^2 = DELT\_A\_X^2 + DELT\_A\_Y^2 + DELT\_A\_Z^2$), in block 1705. The logic 1700 then performs free fall determination subroutine 808 and safe determination subroutine 812, substantially as described above with reference to FIGS. 14B and 14C.

Detection of a safe condition following declaration of a danger condition can be augmented by looking for the safe condition only after finding evidence of an actual impact. As shown in FIG. 15, there may be a quiescent period following the rollover, but it is expect that there will large acceleration changes at the time of impact. The duration of this quiescent period might depend on the distance over which the device is falling. In order to protect against a premature declaration of safe condition during this quiescent period, the logic could monitor for the large acceleration changes characteristic of an impact and only then begin looking for the safe condition. The logic might detect an impact based on the sum of the squares of the time derivatives over one or more sample periods (e.g., $A^2$ is greater than a predetermined impact threshold for one or more sample periods). Such a scheme could be implemented through modification of the safe determination logic shown in FIG. 14C to include the logic shown in FIG. 18. This logic employs an additional global variable, specifically an impact flag used to indicate whether or not an impact has been detected. The impact flag is initially cleared.

Figure 18:
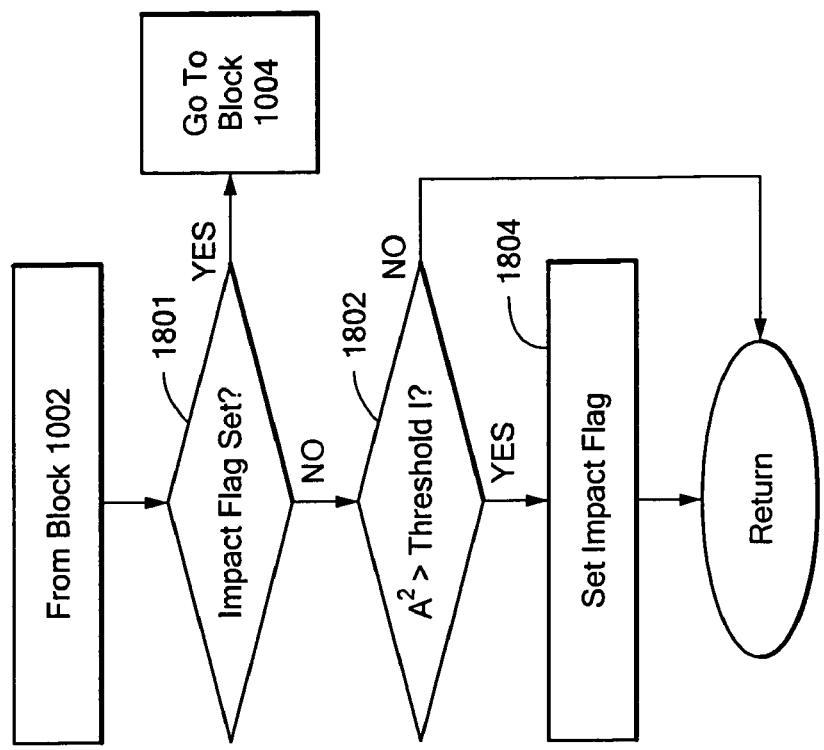
FIG. 18 is a logic flow diagram representing an impact determination subroutine in accordance with an exemplary embodiment of the present invention.

With reference again to FIG. 14C, and also with reference to FIG. 18, if the danger flag is set (YES in block 1002), rather than transitioning to block 1004, the logic would check the impact flag, in block 1801. If the impact flag is clear (NO in block 1801), indicating that the system is in a protected state but no impact has yet been detected, then the logic would check whether $A^2$ is greater than a predetermined impact threshold (Threshold I) in block 1802, and, if $A^2$>Threshold I (YES in block 1802), the logic would set the impact flag in block 1804. If the impact flag is already set (YES, in block 1801), then the logic would proceed to block 1004 in order to test for a safe condition. The impact flag would be cleared in block 1014.

It should be noted that the differential drop/fall detection schemes described above are not limited to use with disk drive protection, but rather could be employed in other applications where detection of a drop/fall or similar condition may be useful. For example, free fall detection could be used to automatically close a protective cover (e.g., for a device display) or to trigger other protective measures. Thus, the present invention is not limited to any particular application.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. For example, predominantly all of the drop detection logic may be implemented as a set of computer program instructions that is converted into a computer executable form, stored as such in a computer readable medium, and executed by a microcontroller.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM, a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for signaling a free fall condition, the method comprising:
   measuring acceleration for each of a plurality of axes in each of a plurality of successive sample periods;
   computing an acceleration delta for each axis for each of the plurality of successive sample periods, wherein each acceleration delta represents a change in acceleration between two successive sample periods;
   computing, for each of the plurality of successive sample periods, a sum of the squares of the acceleration deltas from that sample period; and
   signaling a free fall condition, if the sum falls within a first predetermined range for each of a first predetermined number of consecutive sample periods.

2. A method according to claim 1, wherein the plurality of axes consists of two axes.

3. A method according to claim 1, wherein the plurality of axes consists of three axes.

4. A method according to claim 1, wherein the first predetermined range includes values exceeding a first predetermined threshold.

5. A method according to claim 1, further comprising:
   placing a device in a protected state based upon such signal.

6. A method according to claim 5, wherein the device is a hard drive.

7. A method according to claim 1, further comprising:
   subsequent to signaling the free fall condition, testing for a safe condition and signaling the safe condition, wherein the safe condition is characterized by the sum falling within a second predetermined range for each of a second predetermined number of consecutive sample periods.

8. A method according to claim 7, wherein the second predetermined range includes values less than or equal to a second predetermined threshold.

9. A method according to claim 7, further comprising:
   prior to testing for the safe condition, testing for an impact condition in which the sum falls within a predetermined impact range for at least one sample period and testing for the safe condition only after detecting the impact condition.

10. Apparatus comprising:
    an accelerometer arrangement providing acceleration outputs for each of a plurality of axes;
    a free fall detector in communication with the acceleration outputs, wherein the free fall detector is configured to measure acceleration for each of the plurality of axes in each of a plurality of successive sample periods based on the acceleration outputs; compute an acceleration delta for each axis for each of the plurality of successive sample periods, wherein each acceleration delta represents a change in acceleration between two successive sample periods; compute, for each of the plurality of successive sample periods, a sum of the squares of the acceleration deltas from that sample period; and signal a free fall condition if the sum falls within a first predetermined range for each of a first predetermined number of consecutive sample periods.

11. Apparatus according to claim 10, wherein the accelerometer arrangement includes a single two-axis accelerometer for providing acceleration outputs for each of two axes.

12. Apparatus according to claim 10, wherein the accelerometer arrangement includes a single three-axis accelerometer for providing acceleration outputs for each of three axes.

13. Apparatus according to claim 10, wherein the accelerometer arrangement includes a plurality of accelerometers for providing acceleration outputs for each of the plurality of axes.

14. Apparatus according to claim 10, wherein the first predetermined range includes values exceeding a first predetermined threshold.

15. Apparatus according to claim 10, further comprising:
a device operably coupled to enter a protected state in response to the signal indicating the free fall condition.

16. Apparatus according to claim 15, wherein the device is a hard drive.

17. Apparatus according to claim 10, wherein the free fall detector is further configured to test for a safe condition subsequent to signaling the free fall condition and signal the safe condition, wherein the safe condition is characterized by the sum falling within a second predetermined range for each of a second predetermined number of consecutive sample periods.

18. Apparatus according to claim 17, wherein the second predetermined range includes values less than or equal to a second predetermined threshold.

19. Apparatus according to claim 17, wherein the free fall detector is further configured to test for an impact condition prior to testing for the safe condition and test for the safe condition only after detecting the impact condition, wherein the impact condition is characterized by the sum falling within a predetermined impact range for at least one sample period.

20. Apparatus according to claim 10, wherein the apparatus is one of:
a portable computer;
a portable media player; and
a handset.

21. Apparatus comprising a computer readable medium having embodied therein a computer program for detecting a free fall condition, the computer program comprising:
first program code for measuring acceleration for each of a plurality of axes in each of a plurality of successive sample periods;
second program code for computing an acceleration delta for each axis for each of the plurality of successive sample periods, wherein each acceleration delta represents a change in acceleration between two successive sample periods;
third program code for computing, for each of the plurality of successive sample periods, a sum of the squares of the acceleration deltas from that sample period; and
fourth program code for signaling a free fall condition, if the sum falls within a first predetermined range for each of a first predetermined number of consecutive sample periods.

22. Apparatus according to claim 21, further comprising:
fifth program code for testing for a safe condition subsequent to signaling the free fall condition and signaling the safe condition, wherein the safe condition is characterized by the sum falling within a second predetermined range for each of a second predetermined number of consecutive sample periods.

23. Apparatus according to claim 22, further comprising:
sixth program code for testing for an impact condition and enabling such testing for the safe condition only after the impact condition is detected, wherein the impact condition is characterized by the sum falling within a predetermined impact range for at least one sample period.

* * * * *